(12) United States Patent
Nazir et al.

(10) Patent No.: US 10,996,374 B1
(45) Date of Patent: May 4, 2021

(54) SHORT-TERM WEATHER FORECASTING USING ARTIFICIAL INTELLIGENCE AND HYBRID DATA

(71) Applicant: DATAINFOCOM USA, INC., Austin, TX (US)

(72) Inventors: Mubbashir Nazir, Kolkata (IN); Wensu Wang, Houston, TX (US); Patrick John Thielke, Houston, TX (US); Midhun Elamkulam, Houston, TX (US)

(73) Assignee: DataInfoCom USA, Inc., Austin, TX (US)

( * ) Notice: Subject to any disclaimer, the term of this patent is extended or adjusted under 35 U.S.C. 154(b) by 277 days.

(21) Appl. No.: 15/951,124

(22) Filed: Apr. 11, 2018

Related U.S. Application Data

(60) Provisional application No. 62/484,035, filed on Apr. 11, 2017.

(51) Int. Cl.
    *G01W 1/10* (2006.01)
    *G06N 7/00* (2006.01)
    *G01W 1/02* (2006.01)
    *G01W 1/12* (2006.01)
    *G06K 9/00* (2006.01)

(52) U.S. Cl.
    CPC ............. *G01W 1/10* (2013.01); *G06N 7/005* (2013.01); *G01W 1/02* (2013.01); *G01W 1/12* (2013.01); *G06K 9/0063* (2013.01)

(58) Field of Classification Search
    None
    See application file for complete search history.

(56) References Cited

U.S. PATENT DOCUMENTS

| 10,078,155 B2 | 9/2018 | Elkabetz et al. |
| 10,613,252 B1* | 4/2020 | Mecikalski ............. G01W 1/10 |
| 2013/0166266 A1 | 6/2013 | Herzig et al. |

(Continued)

OTHER PUBLICATIONS

Mohamed Abuella and Badrul Chowdhury; Random Forest Ensemble of Support Vector Regression Models for Solar Power Forecasting; Proceedings of Innovative Smart Grid Technologies, North American Conference; 2017.

(Continued)

*Primary Examiner* — Gregory J Toatley, Jr.
*Assistant Examiner* — Terence E Stifter, Jr.
(74) *Attorney, Agent, or Firm* — Chad Peterson

(57) ABSTRACT

A system includes at least one server implementing a weather forecast engine and in communication with a network, the server to access satellite imagery, published weather predictions, and local measured data via the network; the weather forecast engine to train regional modules using the satellite imagery, published weather predictions, and local measured data; and the weather forecast engine to apply the satellite imagery, published weather predictions, and local measured data to the trained regional modules to obtain regional forecasts. A method for forecasting a weather indicator includes receiving satellite imagery; processing the satellite imagery to generate a weather feature set; applying the weather feature set to a regional module of a weather forecast engine; and forecasting the weather indicator with the weather forecast engine.

19 Claims, 12 Drawing Sheets

(56) References Cited

U.S. PATENT DOCUMENTS

| | | | | |
|---|---|---|---|---|
| 2014/0278108 | A1* | 9/2014 | Kerrigan | G01W 1/10 |
| | | | | 702/3 |
| 2014/0324352 | A1* | 10/2014 | Hamann | G01W 1/10 |
| | | | | 702/3 |
| 2016/0104059 | A1* | 4/2016 | Wang | G06K 9/00335 |
| | | | | 382/103 |
| 2016/0363696 | A1* | 12/2016 | Dao | G01W 1/10 |
| 2017/0031056 | A1* | 2/2017 | Vega-Avila | G06N 3/08 |

OTHER PUBLICATIONS

Cyril Voyant, Gilles Notton, Soteris Kalogirou, Marie-Laure Nivet, Christophe Paoli, Fabrice Motte, and Alexis Fouilloy; Machine learning methods for solar radiation forecasting: a review; Renewable Energy, vol. 105; May 2017; 569-582.

Lei Han, Juanzhen Sun, Wei Zhang, Yuanyuan Xiu, Hailei Feng, and Yinjing Lin; A Machine Learning Nowcasting Method based on Real-time Reanalysis Data; Journal of Geophysical Research: Atmospheres, vol. 122, Issue 7; Mar. 28, 2017.

Xiaoyan Shao, Siyuan Lu, and Hendrik F. Hamann; Solar radiation forecast with machine learning [Abstract]; 2016 23rd International Workshop on Active-Matrix Flatpanel Displays and Devices (AM-FPD); Jul. 2016; 19-22.

Sue Ellen Haupt and Branko Kosovic; Big Data and Machine Learning for Applied Weather Forecasts; 2015 IEEE Symposium Series on Computational Intelligence; 2015; 496-501.

Ricardo Marquez, Hugo T.C. Pedro, and Carlos F.M. Coimbra; Hybrid solar forecasting method uses satellite imaging and ground telemetry as inputs to ANNs; Solar Energy 92; 2013; 176-188.

Renate Hagedorn, Thomas M. Hamill and Jeffrey S. Whitaker; Probabilistic Forecast Calibration Using ECMWF and GFS Ensemble Reforecasts. Part I: Two-Meter Temperatures; Monthly Weather Review, vol. 136, Jul. 2008; 2608-2619.

Yibin Yao, Chaoqian Xu, Junbo Shi, Na Cao, Bao Zhang, and Junjian Yang; ITG: A New Global GNSS Tropospheric Correction Model; https://www.nature.com/articles/srep10273; Jul. 21, 2015.

Fei Wang, Zengqiang Mi, Shi Su, and Hongshan Zhao; Short-Term Solar Irradiance Forecasting Model Based on Artiticial Neural Network Using Statistical Feature Parameters; Energies 2012; 1355-1370.

Jon Walker; AI for Weather Forecasting—In Retail, Agriculture, Disaster Prediction, and More; techemergence.com (retrieved from https://www.techemergence.com/ai-for-weather-forecasting/ Sep. 25, 2018); Oct. 7, 2017.

\* cited by examiner

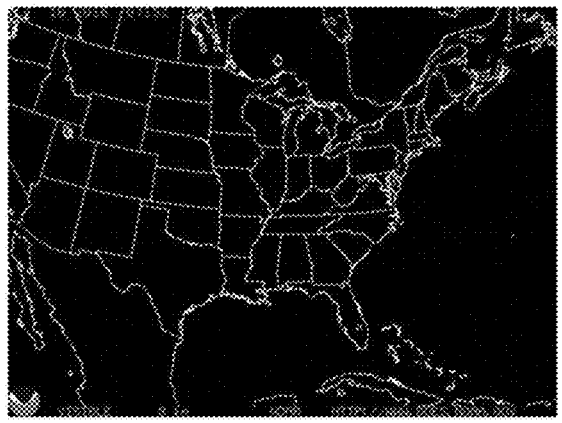
FIG. 8
FIG. 9
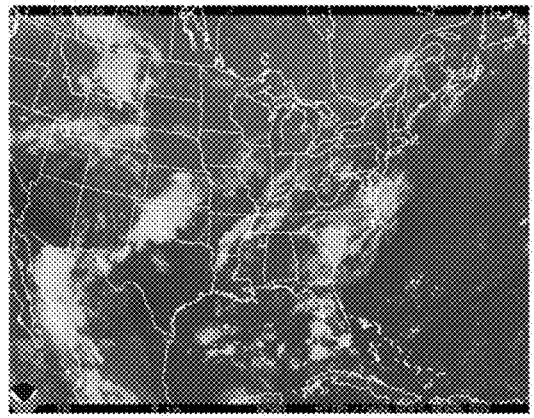
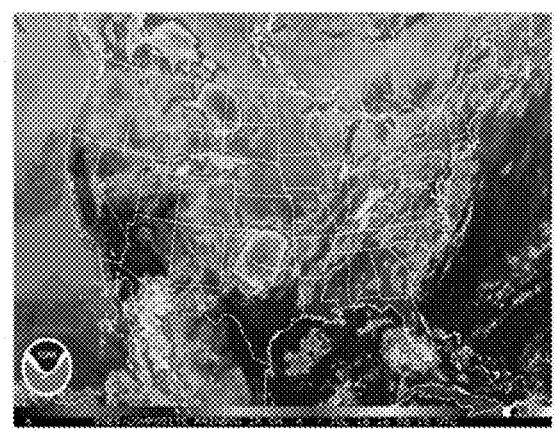
FIG. 10

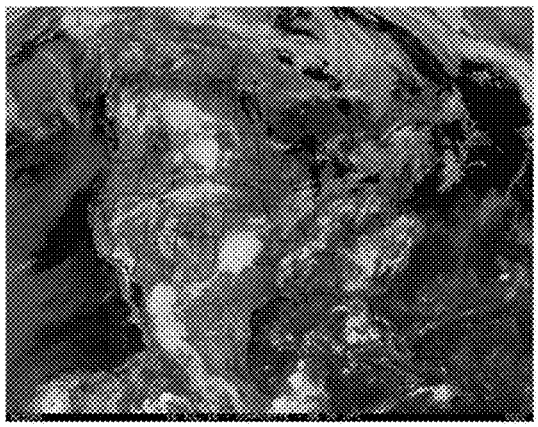
FIG. 11
FIG. 12
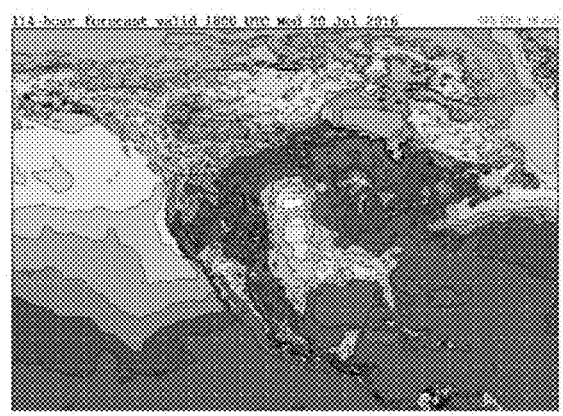
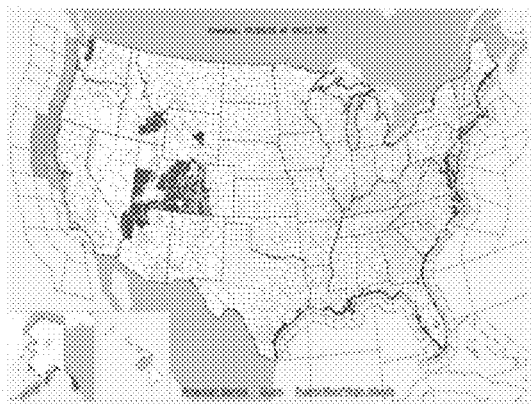
FIG. 13

SHORT-TERM WEATHER FORECASTING USING ARTIFICIAL INTELLIGENCE AND HYBRID DATA

CROSS-REFERENCE TO RELATED APPLICATION(S)

This application claims benefit of U.S. Provisional Application No. 62/484,035, filed 11 Apr. 2017, which is incorporated herein by reference in its entirety.

FIELD OF THE DISCLOSURE

This disclosure relates to systems and methods for custom weather forecasting using artificial intelligence and hybrid data.

BACKGROUND

Several industries are increasingly reliant on weather analytics and prediction systems to predict impactful events and business outcomes. With these predictions, businesses hope to preempt problems and improve business performance. However, such weather forecasting systems are becoming increasingly complex, and lack the ability to quickly, accurately, and reliably forecast weather which a given business values at a certain point in time.

Conventional weather forecasting applies the principle of physics supplemented by a variety of statistical and empirical techniques to numerically simulate atmospheric conditions at fixed spatial grids and temporal intervals, which is a complex and challenging process to predict weather accurately. Such forecasting consumes large amounts of computational power and is exceptionally sensitive to initialization errors (imprecision in measurement of initial conditions).

The two most widely-used models are those from the European Centre for Medium-Range Weather Forecasts in Europe (ECMWF) and NOAA's National Centers for Environmental Prediction (NCEP) in the United States. Others publish models which operate on the same physics described above.

Weather has a large and notoriously unpredictable effect on our life. High-powered storms like tornadoes and hurricanes are infamously responsible for $billions in damage and kill hundreds and thousands each year. When heat waves roll in, we are likewise accustomed to hearing the death toll figures rise.

BRIEF DESCRIPTION OF THE DRAWINGS

The present disclosure may be better understood, and its numerous features and advantages made apparent to those skilled in the art by referencing the accompanying drawings.

FIG. 8, FIG. 9, FIG. 10, FIG. 11, FIG. 12, and FIG. 13 include illustrations of example satellite imagery or map overlays.

The use of the same reference symbols in different drawings indicates similar or identical items.

DETAILED DESCRIPTION

In an example embodiment, a system and method are disclosed for forecasting weather features, including but not limited to wind speed and direction, air temperature, solar radiation (irradiance), atmospheric pressure, relative humidity, and more. Using artificial intelligence models (including but not limited to machine learning, deep learning, and computer vision algorithms) together with hybrid datasets (including but not limited to remote sensing/satellite images, weather forecast model outputs, and in-situ measurements, at both land and offshore sites), a flexible model is derived with respect to an objective function that also exhibits demonstrably more accurate predictions than conventional models.

In an example, the system includes one or more servers that incorporate a weather forecast engine system to draw weather features from satellite imagery and other unstructured sources, as well as, national or global predictions and local weather measurements, to both generate modules of the weather forecast engine and to facilitate weather forecasts using the weather forecast engine. In addition, the system can utilize annotated historical data to train one or more modules for use by the weather forecast engine for weather forecasting.

Figure 1:
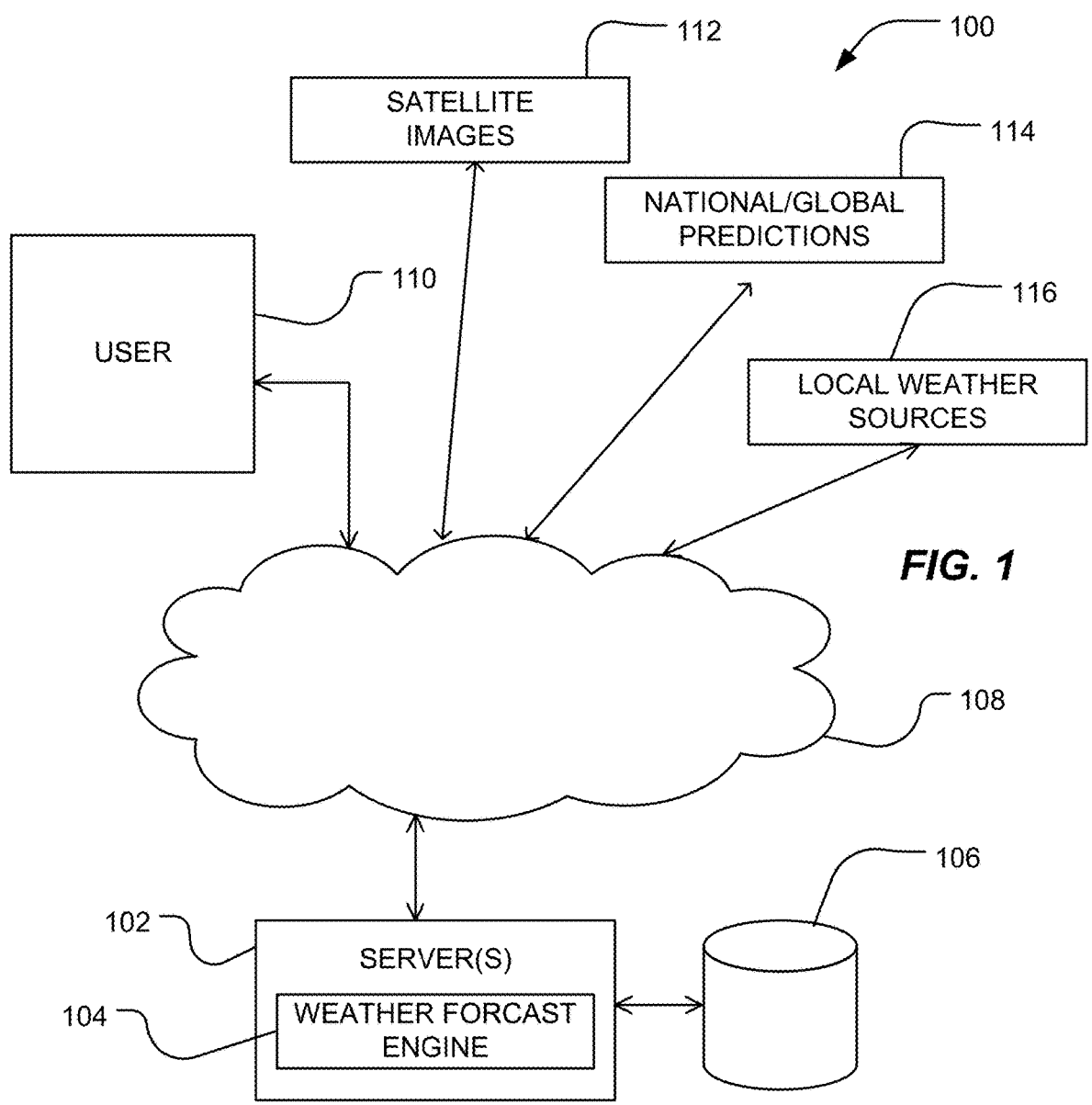
FIG. 1 illustrates an example system for forecasting weather.

For example, as illustrated in FIG. 1, a system 100 includes one or more servers 102 implementing a weather forecast engine 104. A database 106 can be accessible by the one or more servers 102. In the example, the database 106 includes historical weather measurements, imagery, or predictions, and can include annotated weather-related information useful in training modules of the weather forecast engine.

Further, the one or more servers 102 can be connected to the network 108 through which satellite images 112, national or global predictions 114, local weather sources 116 or other weather-related indicators, data, or measurements can be acquired. In addition, a user device 110 can access the one or more servers 102 to interact with the weather forecasting engine 104.

The network 108 can be a local area network (LAN), a wide area network (WAN), a global network (e.g., the Internet), or a virtual private network (VPN) implemented across one or more of a LAN, WAN, or global network. Optionally, the network 208 can include wired and wireless components. For example, the network 108 can be implemented using components such as ethernet, twisted-pair, or fiber-optic, or a wireless connection, such as wireless connections complying with IEEE 802.1x.x, such as Wi-Fi, WiMAX, Bluetooth, or any combination thereof.

In a particular example, the system 100 can utilize unstructured data 112 such as satellite imagery, satellite videos, maps, weather overlays, chart images, audio weather feeds, among other unstructured data, or any combination thereof to generate modules of the transport of a weather forecasting engine 104. Further, national or global predictions 114, such as those published by national and international weather and oceanographic agencies, can be utilized in both training modules and forecasting using such modules. Similarly, local weather sources 116, such as local weather stations, airport weather feeds, distributed weather devices, weather buoys, or weather balloons, can be utilized in both generating modules and forecasting using such modules of the weather forecasting engine 104.

An exemplary unstructured data source includes a video data source, an image data source, an audio data source, narrative text, or any combination thereof. A structured data source has a relational structure in which identified variables are associated with a set of machine-readable values. An exemplary machine-readable value includes numerical values, integer values, categories, Boolean values, or combinations thereof, among others. The values within the set of machine-readable values may be associated with a time stamp. As such, the association between variables and values in the structured data source is relatively simple, and not complex. In contrast, an unstructured data source utilizes significant processing to associate a value with the variable entity. Further, the variable entity may not be readily identified with the unstructured data source. As such, an unstructured data source may not include an association with a variable entity or a value associated with the variable entity and further may lack a time stamp associated with the value. As such, processing an unstructured data source can include identifying which variable entity to associate with the data source, determining a value, and optionally extracting a time stamp associated with the value from the unstructured data source.

Further, the one or more servers 102 can be accessed by a user device 110 through the network 1082. For example, the one or more servers 102 may offer a network-based interface, such as a browser-based interface or an application-based interface, so that the user device 110 can display forecasts and interact with the weather forecasting engine 104.

Figure 2:
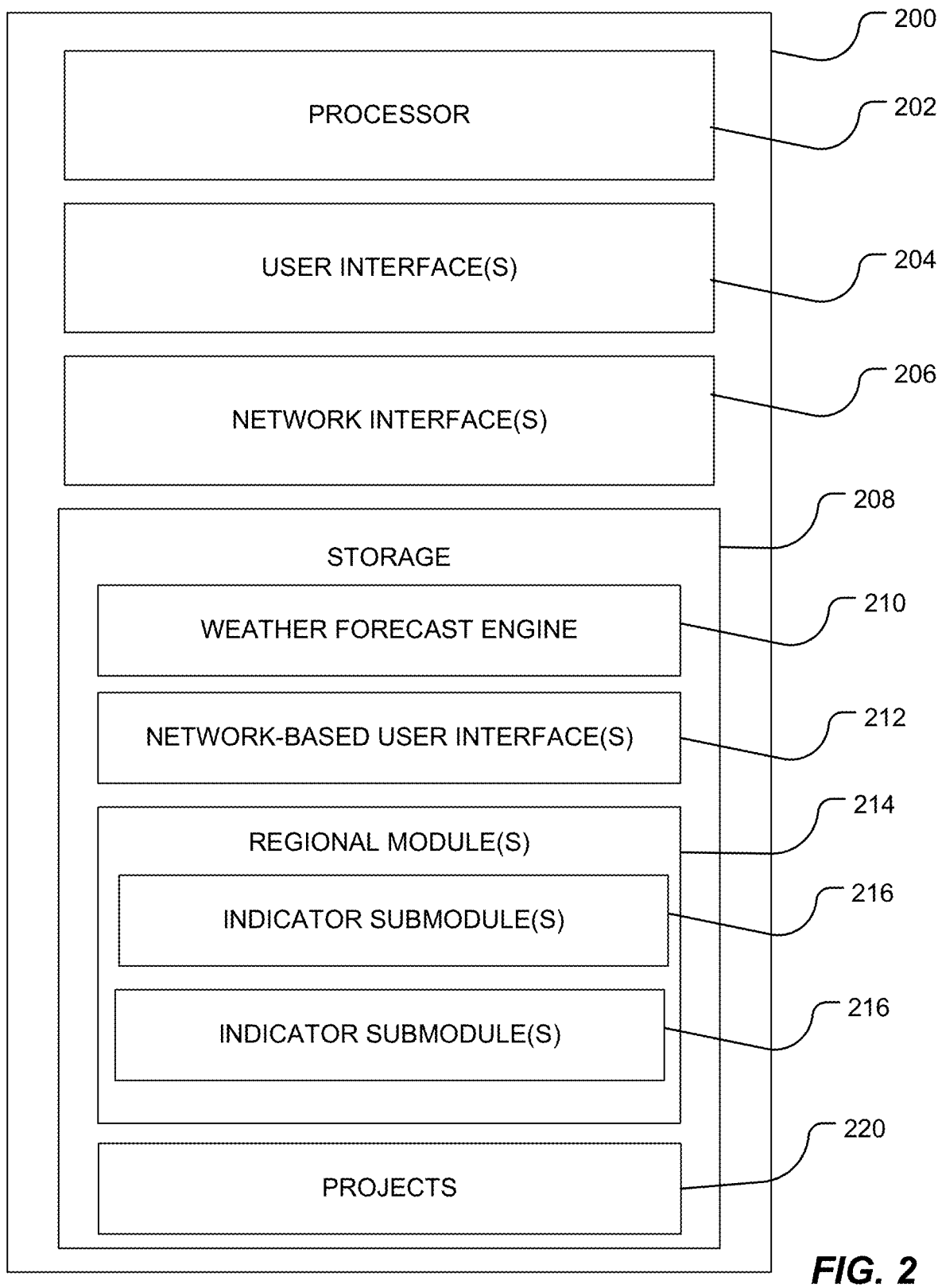
FIG. 2 illustrates an example system for generating weather forecasts.

The server or servers 102 can be computation systems that interact to implement a weather forecast engine. As illustrated in FIG. 2, the computational system 200 can include a processor 202, user interface(s) 204 in communication with the processor 202, and network interface(s) 206 in communication with the processor 202.

The user interfaces 204 can be utilized to provide data and instructions to be implemented by the processor 202. Example user interfaces 204 can include ports to which user interface devices are attached and can be wired or wireless. Example ports include universal serial bus (USB), high definition multimedia interface (HDMI), video graphics array (VGA), Bluetooth, digital video interface (DVI), Firewire, display port, or any combination thereof.

The network interface(s) 206 can be wired or wireless interfaces providing access to a local area network (LAN), a wide area network (WAN), a global network, or a virtual private network (VPN) implemented across one or more of a LAN, WAN, or global network. Optionally, the network interface(s) 206 can include components to access wired and wireless networks. For example, the network interface(s) 206 can be implemented using wired components such as ethernet, twisted-pair, or fiber-optic, or a wireless connection, such as wireless connections complying with IEEE 802.1x.x, such as Wi-Fi, WiMAX, Bluetooth, or any combination thereof.

Further, the computational system 200 can include storage 208 in communication with the processor 202. The storage can be implemented as random access memory (RAM), read-only memory (ROM), or long-term storage, or any combination thereof. The long-term storage can incorporate optical storage, magnetic storage, or solid-state storage, or any combination thereof. The storage 308 can include instructions and data to implement the functionality of the computational system.

The storage 208 can include a weather forecast engine 210, which can train modules and use such modules to forecast weather indicators. Weather forecast engine 210 can utilize heuristics or algorithms to form regression models, Markov chains, time series models, state space models, Bayesian models, neural networks, or any other appropriate model, or any combination thereof. In an example, the weather forecast engine 210 can include trained neural network modules, such as modules taking the form of long short-term memory units or recurrent neural network units. In particular, the weather forecast engine 210 can generate modules such as regional modules 214. The regional modules 214 can be developed for different regions, each region having a different list and ordering of influential weather indicators. For example, cities or regions proximal to an ocean can be more influenced by changing wind patterns throughout the day caused by differences in temperature on land and in sea than regions, such as cities, disposed interior to the continent. On the other hand, humidity on interior regions may have greater variability and a bigger influence on weather conditions.

In addition, regional modules 214 can be developed with different objective functions that emphasize different weather indicators or can incorporate submodules 216 that are developed using objective functions focused on particular weather indicators relative to other submodules. For example, an indicator submodule can be developed with an emphasis on an objective function that is emphasizes solar irradiance for the forecasting of solar irradiance. whereas another indicator module can be developed using objects and functions that emphasize the forecasting of windspeed. As such, an energy grid or a renewable energy company can turn to different modules developed with objective functions that are better predictors of particular indicators to determine output of a renewable energy resource. For example, a power grid or solar energy company can turn to a module generated using an objective function that emphasizes accuracy of forecasting solar irradiance to determine expected output of solar power arrays. On the other hand, a wind renewable energy company can turn to a module developed using objective function that emphasizes accurate prediction of windspeed to determine energy output from a wind farm.

The storage 208 can further include instructions for implementing a network-based user interfaces 212. For example, the network-based user interfaces 212 can be browser-based interfaces or application-based interfaces served to a user device over a network that permits the user to interact with the weather forecast engine 210.

Optionally, the system 200 can store projects 220. The projects can include some or all of the information related to the development or use of regional modules 218 or indicator submodules 216.

Figure 3:
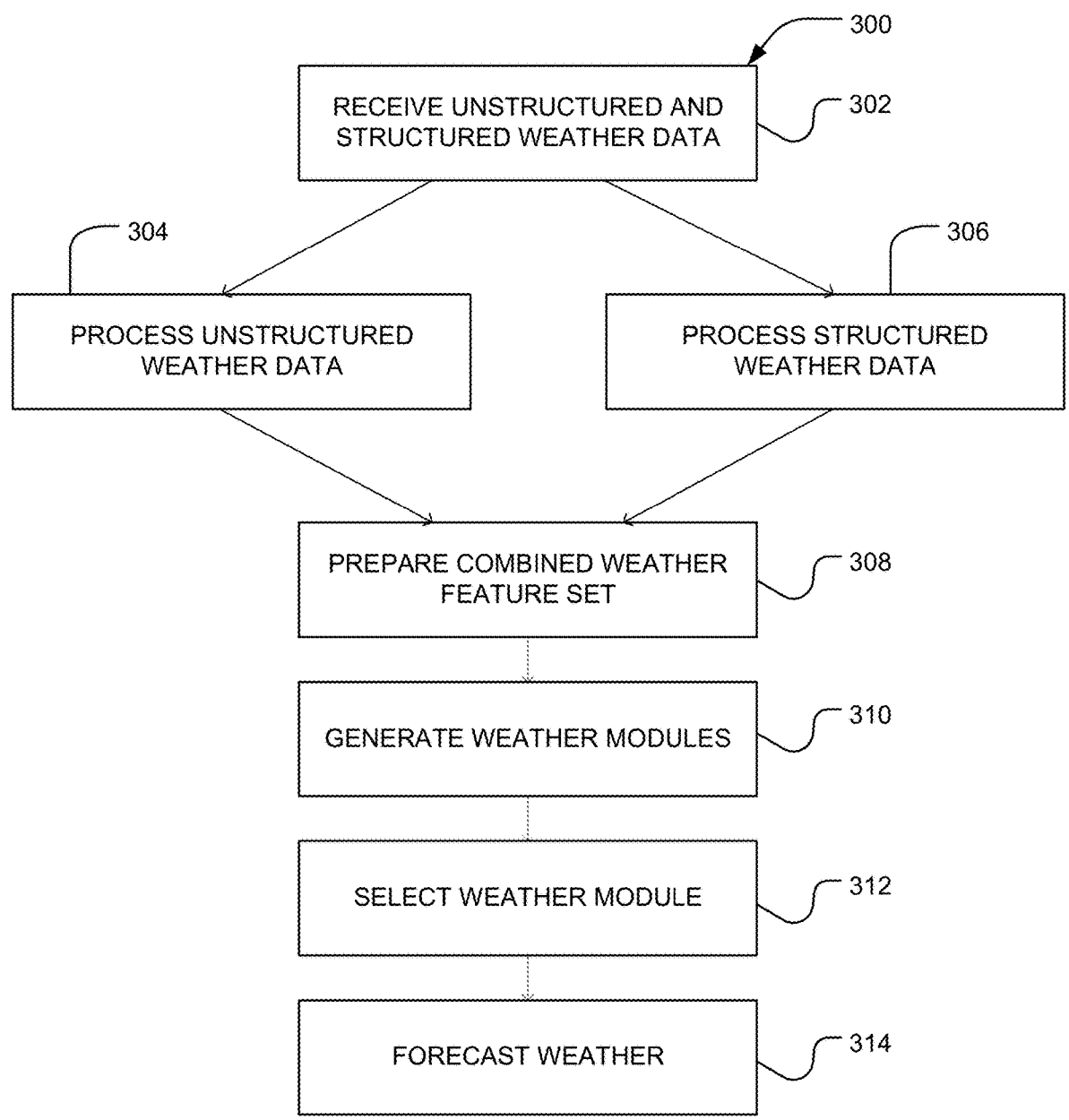
FIG. 3, FIG. 4, FIG. 5, FIG. 6, and FIG. 7 illustrate various example methods of preparing and utilizing forecast modules for forecasting weather features.

As illustrated in FIG. 3, the system or method 300 includes receiving unstructured and structured weather data, as illustrated at 302. As illustrated at 304, the unstructured weather data can be processed. For example, image processing techniques or computer vision methods can be utilized to generate structured data from satellite imagery, map overlays, audio weather's signals, images of charts, and other unstructured data to determine factors such as Cloud Cover, High/Low Dense Cloud Area, Cloud Vector (speed and direction), Presence of Water Vapor, Clear Sky Ratio. In a further example, the unstructured data may be narrative text such as an RSS feed or narrative text announcements made by weather bureaus. Imagery and other video and other image based unstructured data can utilize image processing technologies to generate desired factors for input into modules. Similarly, artificial intelligence can be utilized to process narrative text to glean relevant factors that can be applied into a structured data format.

As illustrated 306, structured weather data such as temperature and pressure windspeed wind direction irradiance, among others, can be processed, as illustrated at 306. For example, data may be extracted, formatted, and cleaned.

As illustrated at 308, a combined weather feature set can be prepared, for example, utilizing structured data generated from the processed unstructured weather data and the structured data formatted and cleaned from the structured weather data.

As illustrated at 310, whether modules can be generated utilizing such the combined weather feature set. Weather forecast engine 210 can generate modules utilizing heuristics or algorithms to form regression models, Markov chains, time series models, state space models, Bayesian models, neural networks, or any other appropriate model, or any combination thereof. In an example, the modules can include trained neural network modules, such as modules taking the form of long short-term memory units or recurrent neural network units.

In particular, the weather modules can be generated for specific regions, such as areas proximal to the city proximal to a particular facility. Other regions include area around solar farms, wind farms, oceanographic stations. Such modules can be further differentiated based on the objective function utilized in generating the modules. For example, a module can be generated for a city that is generated based on an objective function that emphasizes solar irradiance. Another module may emphasize windspeed, whereas a further module may emphasize temperature or humidity.

As illustrated at 312, when seeking to forecast a particular weather indicator, a weather module may be selected based on the region and the desired indicator. Weather factors and other data relevant to the current conditions can be applied to the selected weather module to forecast the weather or a particular indicator, as illustrated at 314.

Figure 4:
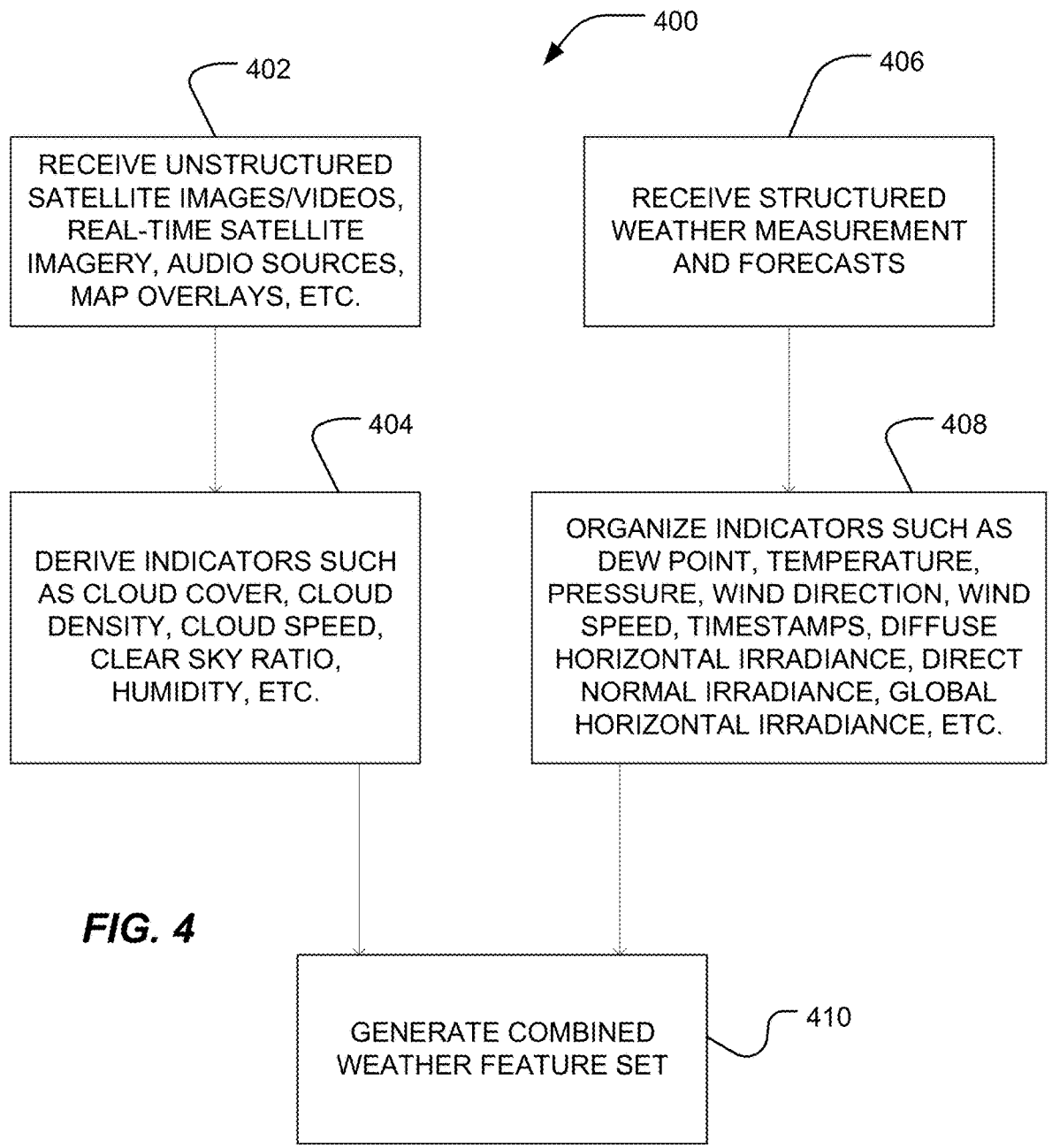

In a particular example illustrated in FIG. 4, a method 400 includes receiving unstructured satellite images or videos, real-time satellite imagery, audio sources such as weather broadcasts, map overlays or other unstructured data. From the unstructured data, indicators can be derived such as cloud cover, cloud density, cloud speed, clear sky ratio, humidity, or other indicators, as illustrated at 404.

For example, satellite imagery can be processed through various image processing techniques to generate indicators associated with the weather. For example, as illustrated in FIG. 8 and FIG. 9, multispectral satellite imagery can be provided or utilized to generate indicators. In particular, multispectral satellite imagery is updated every 15 minutes in the United States and similarly in other countries. Often, these images are broadcast as a string in a loop to create a video. In particular, FIG. 8 and FIG. 9 illustrated examples of multispectral video imagery. Further, the broadcast or generally satellite imagery may include overlays indicative of weather patterns such as those illustrated in FIG. 10 and FIG. 11. Further, a forecast based on various weather models and outputs can be broadcast or published. For example, as illustrated in FIG. 12, a map overlay with iso-lines indicative of pressure, temperature, or humidity may be processed from an image. In another example illustrated in FIG. 13, particular weather events can be highlighted based on the color code over a county map or other map.

Other example imagery includes Colorized Infrared Satellite Feeds (for cloud cover)—these satellite feeds have special color enhancements that help in identifying the areas that have high cloud cover versus the ones that have low cloud cover. The satellite feeds also help in identifying the areas that have significantly taller clouds, which often correlate with more active weather systems.

In another example, Water Vapor Satellite Feeds (for water vapor)—these feeds use wavelengths that are highly sensitive to the moisture content in the atmosphere. These feeds also use enhanced color enhancements to differentiate between the high, less and no moisture content areas.

Figures 16, 17, 18:
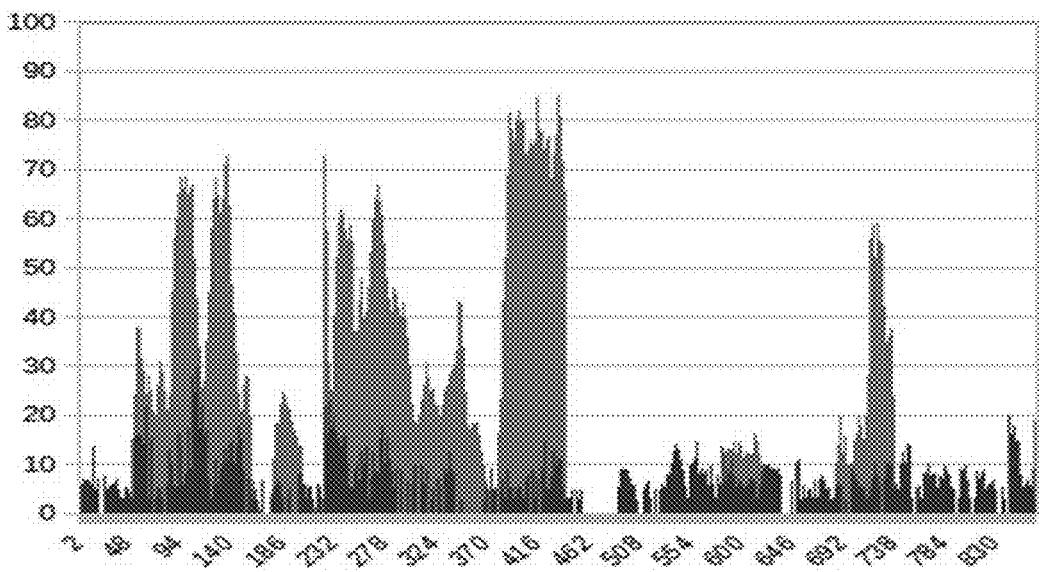
FIG. 16 and FIG. 17 include illustrations of example narrative or computer-generated text from which weather features can be derived.
FIG. 18 includes a chart indicative of weather features derived from satellite data.
Figure 19:
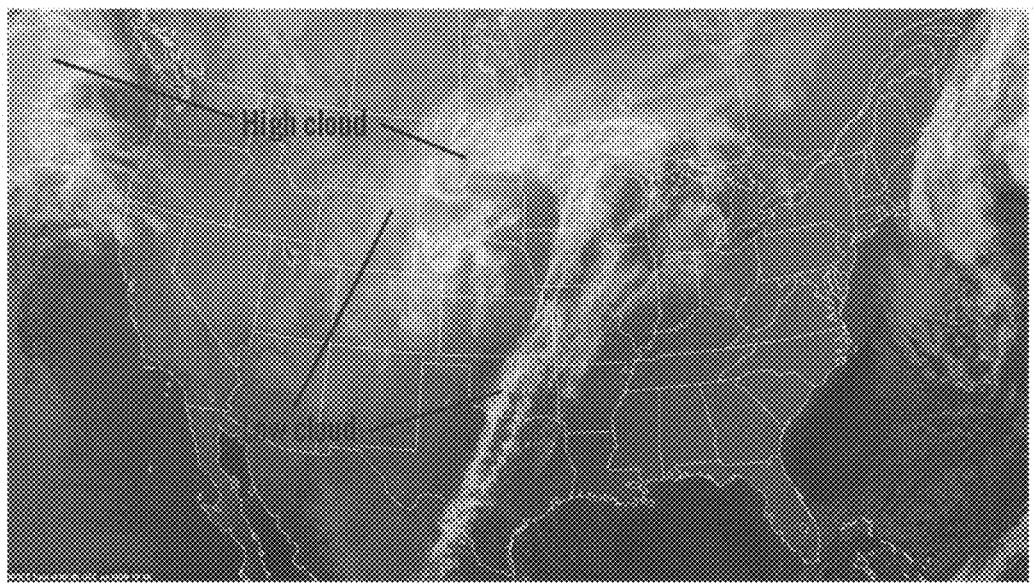
FIG. 19 includes an illustration of an exemplary satellite imagery including a designation of the nature of cloud cover.

Once images are obtained, feeds can be segmented based on the target areas, and from each segmented area the enhanced color codes can be used to extract cloud related features. For instance, any target area with high cloud density and tall clouds are represented by yellow and orange color enhancements, as illustrated in FIG. 19, whereas the areas that have clear sky are represented by white colors. Similarly, for extracting the water vapor and moisture content use color specifics to determine the level of moisture and water vapor in the area, where deep blue and white areas indicate high moisture content areas whereas the areas indicated by dark orange and brown represent little or no moisture. Accordingly, various weather imagery can be utilized to determine factors, such as windspeed or percentage of cloud cover, as illustrated in FIG. 18.

In an additional example, narrative text may be used in processed using artificial intelligence system to derive structured data from announcements, newsfeeds, or various warnings provided by different weather services. For example, as illustrated in FIG. 16 or FIG. 17, various messages provided by weather services can include data that can be extracted.

Figures 14, 15:
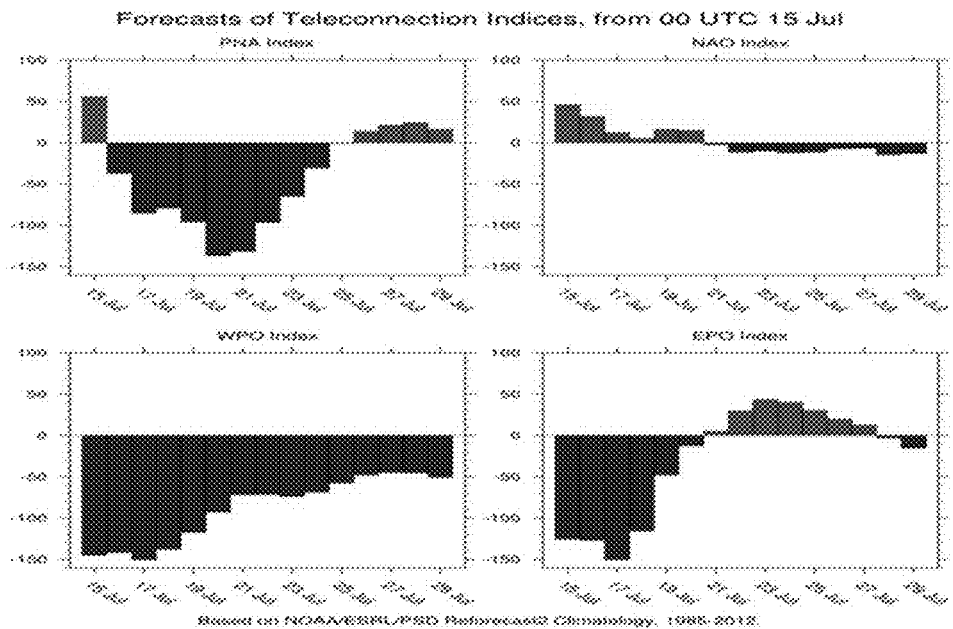
FIG. 14 and FIG. 15 include examples of paired weather feature data.

In addition, the system can receive structured weather measurements and forecasts, as illustrated at 406. The structured weather measurements and forecasts can be organized seeking particular indicators useful for particular models or modules, as illustrated at 408. For example, structural data such as various indices illustrated in FIG. 14 or reports, as illustrated in FIG. 15, can be provided in the form compared data from which indicators such as dewpoint, temperature, pressure, wind direction, wind speed, timestamps, diffuse horizontal irradiance, direct normal irradiance, global horizon irradiance, among others can be extracted.

The indicators derived as illustrated at 404 and the organized indicators derived as illustrated at 408 can be combined into a weather feature set, as illustrated at 410. Such a feature set can be used to both generate modules for use by the weather forecast engine or as input of a present state to be applied to the module to generate a forecast. As above, different features or indicators may have different levels of importance in forecasting conditions in different regions and may have differing importance in forecasting different indicators in a particular region.

Figure 5:
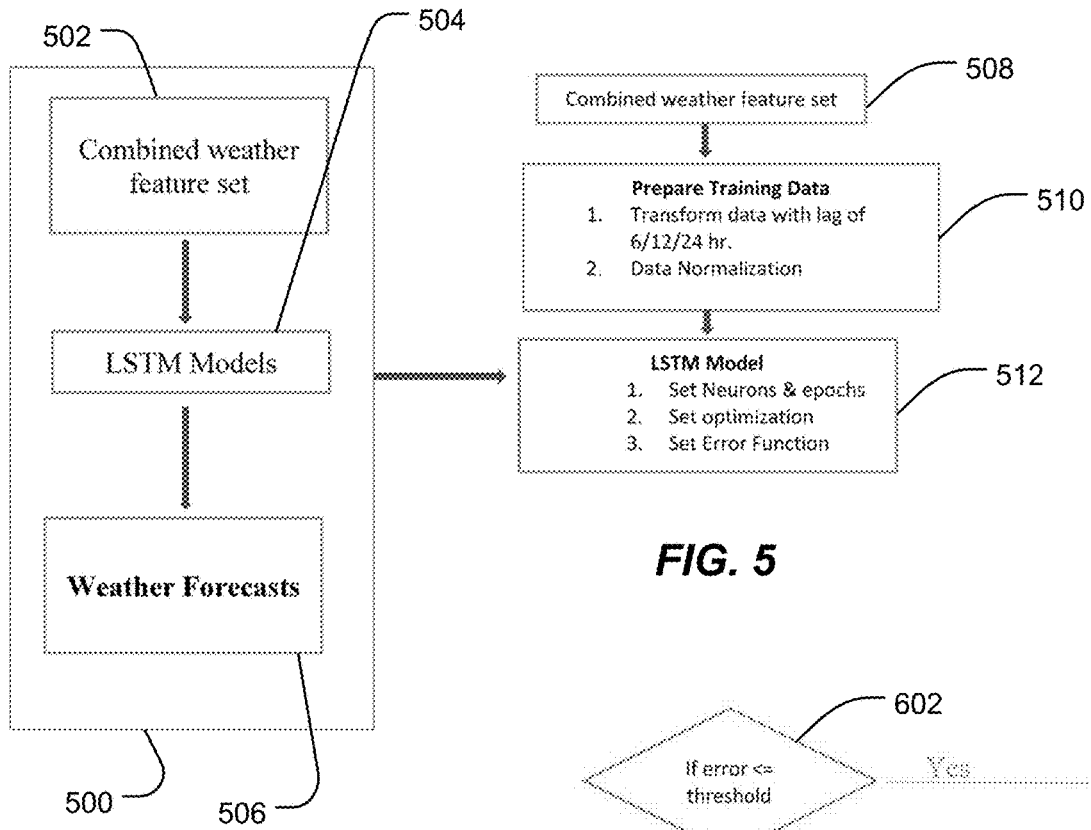

Turning to FIG. 5, the combined weather set 502 can be applied to a particular module. In this example, the module is a neural network model, such as a long short-term memory (LTSM) neural network model. Historical data from the combined weather feature set illustrated 508 can be used to prepare training sets, as illustrated 510. For example, the training sets can be established to train for predictions of different periods such as 6 hours, 12 hours, 24 hours, for seven days. Such times are examples and other lengths of time can be used. Further, the data set can be normalized.

As illustrated 512, the framework of the LSTM module can be established including an objective function to use in training the module. Such objective functions may emphasize one or more weather indicators and various different modules can be trained to various different objective functions that emphasize different weather indicators. For example, a module may be trained using an objective function that emphasizes a clear sky ratio or a solar irradiance. In another example, a module may be trained using an objective function that emphasizes windspeed. As such, different modules that are applied to the weather forecast engine can be enhanced to provide better predictions for more accurate predictions of features important to one or more industries such as the solar industry or the windfarms or agricultural.

As the various modules 504 are generated, such modules can then be utilized to weather forecasting is illustrated at 506.

Figure 6:
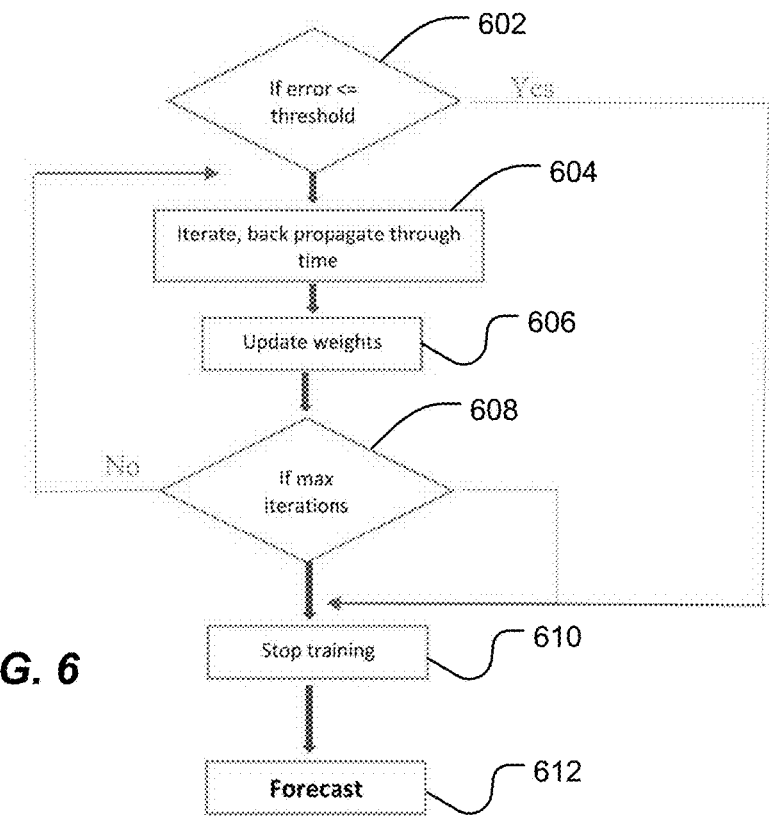

As illustrated in FIG. 6, the training, for example at 512 of FIG. 5, can follow a particular method of checking an error rate over a set number of iterations. For example, a data set can be used to generate an error rate to determine whether the error rate is less than or equal to a threshold, as illustrated at 602, the error rate is not less than the threshold, the system can iterate to back propagate through time, as illustrated at 604, to further update weights within the modules, as illustrated at 606, to generate or enhance the module. If the maximum number of iterations has not been reached, the system can then return to checking the threshold at 602 and iterate through the process until a maximum number of iterations is achieved or the error threshold is met. Once the iterations have been achieved or the error threshold has been achieved, the training can stop, as illustrated at 610, and the module can then be used for forecasting, as illustrated at 612.

Figure 7:
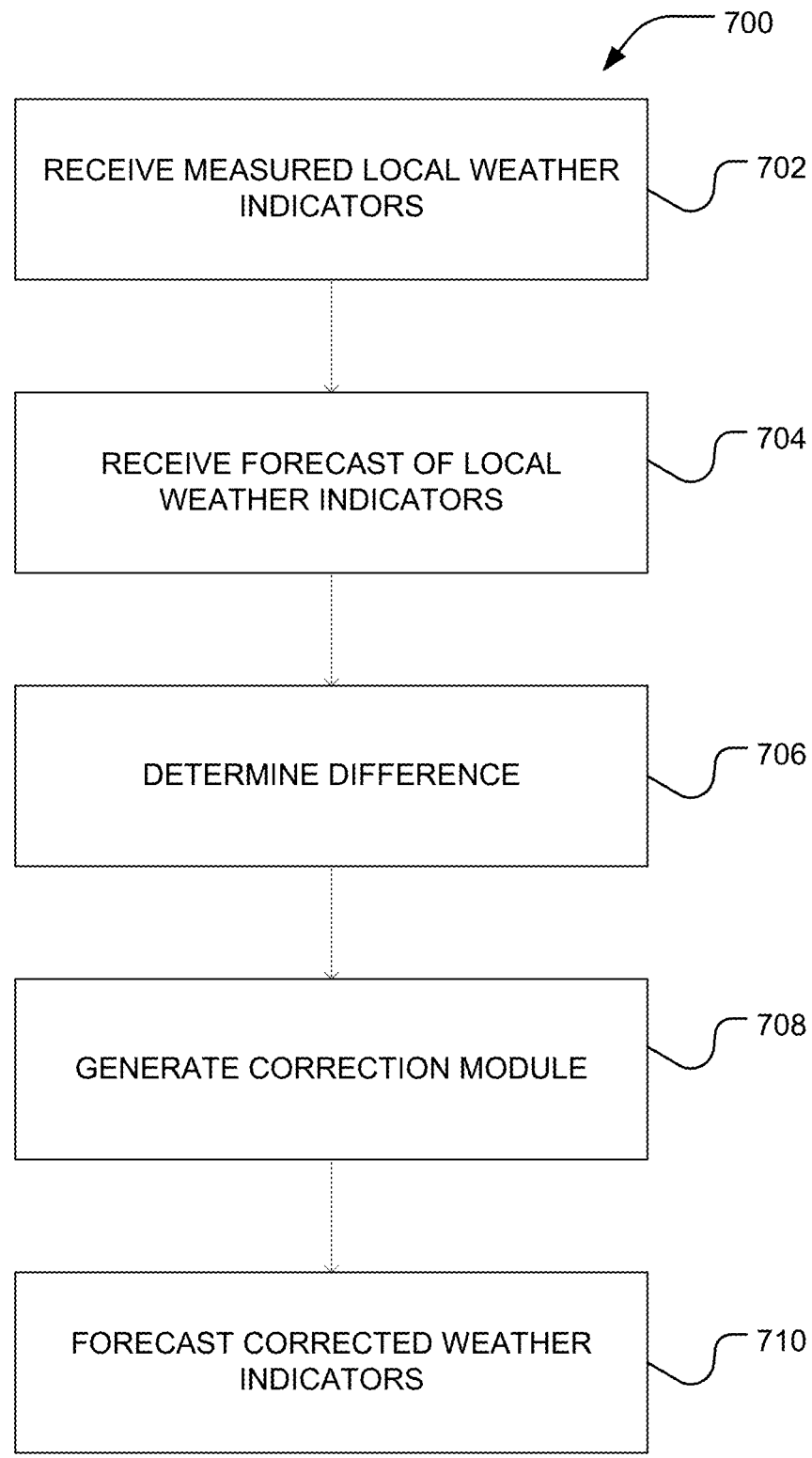

The weather forecasts of the system or weather forecasts provided by national bureaus using other modeling approaches can be further enhanced by analyzing error rates and modeling such error rates using artificial intelligence. For example, as illustrated in FIG. 7, the method 700 includes receiving measured local weather indicators, as illustrated at 702.

As illustrated at 704, a forecast of local weather indicators can also be received and processed. As illustrated 706, a difference between the forecast and the measured local weather indicators can be determined. Such difference is determined particularly for historical data that can be used in generating a correction module, as illustrated at 708. In an example, the correction module can take the form of a neural network model, such as a LSTM module.

Figure 20:
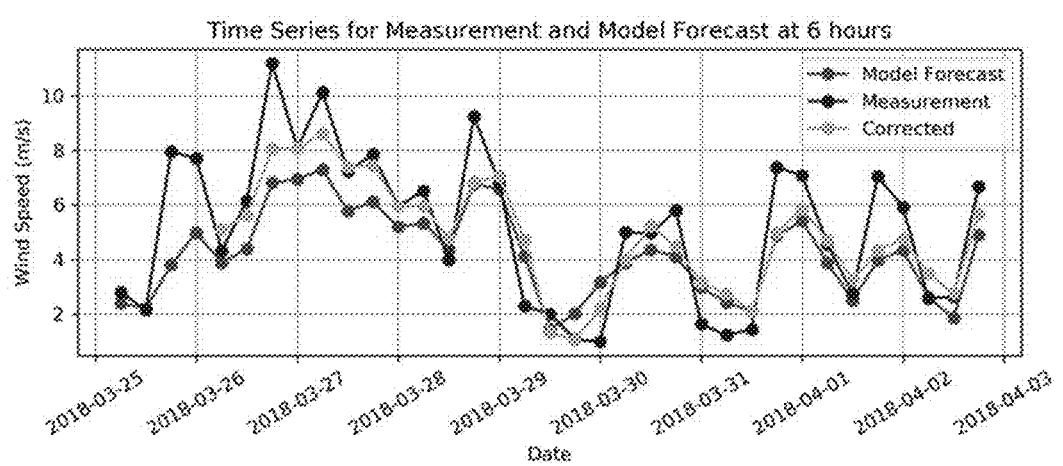
FIG. 20, FIG. 21, FIG. 22, and FIG. 23 include graphs illustrating the forecast of weather conditions.
Figure 21:
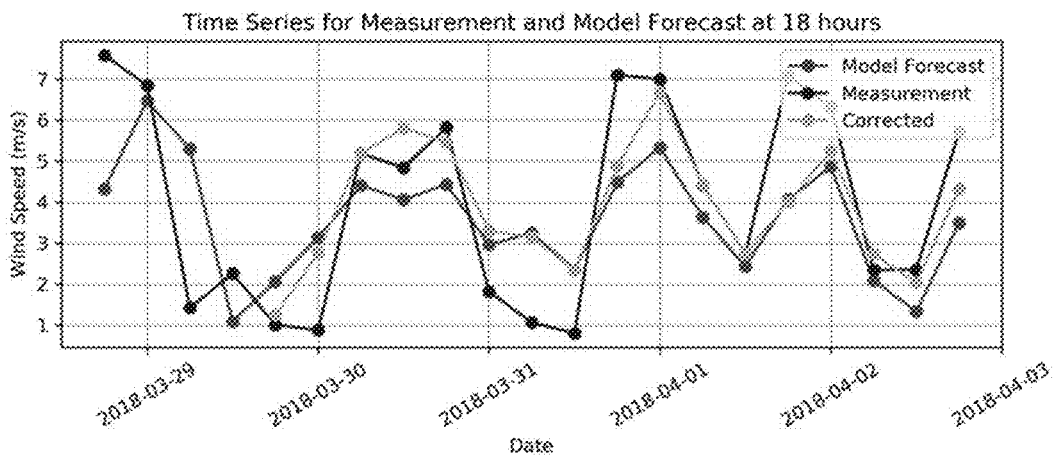
Figure 22:
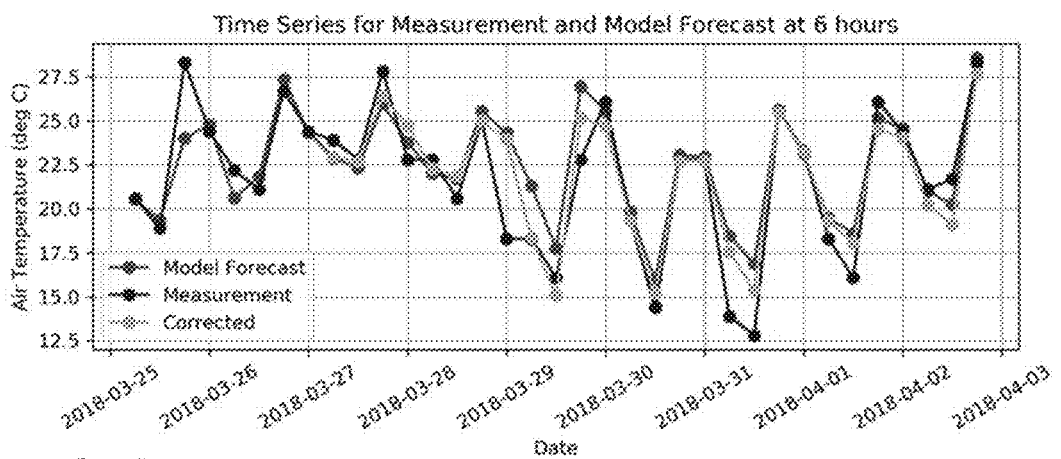
Figure 23:
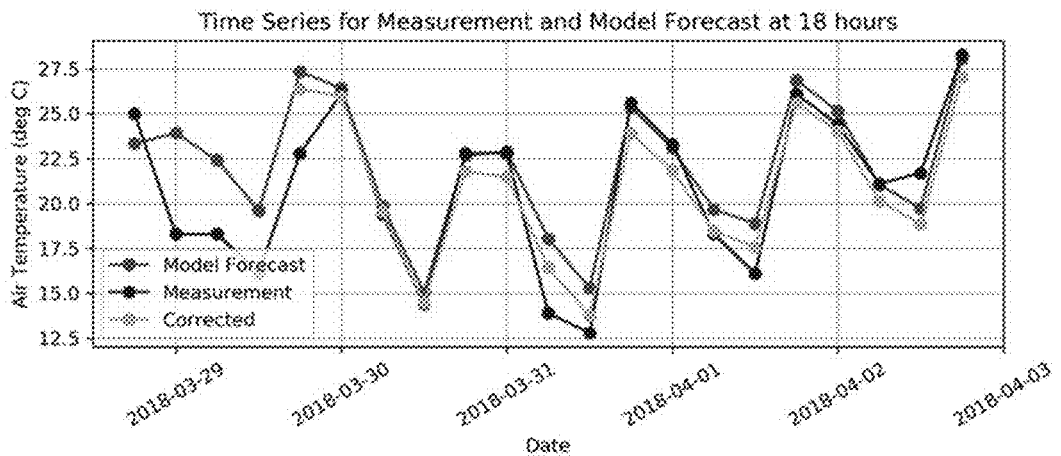

Utilizing the generated module, future forecasts of local weather indicators can then be used as an input to forecast corrected weather indicators, as illustrated at 710. In such a case, as indicated in Table 1 and FIGS. 20, 21, 22, 23, can be improved. Table 1 indicates that the root mean square error is reduced using such a correction module which is further illustrated in the figures. For example, FIG. 20 shows an improvement in the six hour forecast of windspeed. A similar improvement for windspeed is illustrated in FIG. 21 at 18 hours. Such a timeseries approach can also be applied at 6 and 18 hours to air temperature, as illustrated in FIGS. 22 and 23.

TABLE 1a

The comparison of wind speed rmse for original NCEP model forecast and our corrected forecast at JAM airport.

| Forecast Hours | RMSE for Original Forecast (m/s) | RMSE for Corrected Forecast (m/s) |
| --- | --- | --- |
| 6 | 1.68 | 1.31 |
| 12 | 1.54 | 1.47 |
| 18 | 1.64 | 1.50 |
| 24 | 1.68 | 1.42 |
| 48 | 1.72 | 1.47 |

TABLE 1b

The comparison of air temperature rmse for original NCEP model forecast and our corrected forecast at JAM airport.

| Forecast Hours | RMSE for Original Forecast (° C.) | RMSE for Corrected Forecast (° C.) |
| --- | --- | --- |
| 6 | 2.15 | 1.75 |
| 12 | 1.83 | 1.49 |
| 18 | 1.87 | 1.59 |
| 24 | 1.62 | 1.50 |
| 48 | 1.97 | 1.95 |

Advantages of the present system are found in speed and accuracy of forecast local weather indicators, particularly for industries including renewable energy, agriculture, and transportation. Errors in conventional weather forecasting models tend to be introduced during initialization, or the measurement of initial conditions, and amplified by the chaotic nature of the evolution equations of the dynamical system. In a rules-based (conventional) system, imperfect/imprecise measurements of the world at time zero tend to compound as these measurements form the foundation of forecasts ever-further into the future.

The strength of Artificial Intelligence (AI) is that it does not assume anything about the state of the world, unlike physical models, and therefore reduces many of these initialization errors. The present system uses AI techniques, sometimes in conjunction with our meta-algorithms, to achieve measurably better forecasts targeted however the end-user desires.

As disclosed herein, the methods use operational and historical data for generating weather forecasts with a purely data-driven process. In an example, the system consists of three modules to process hybrid data—a combination of structured (numbers) and unstructured (videos and images) as input and provides short-term weather forecasts by a cluster of computational devices.

The three modules can include Satellite Image module, Model Forecast Correction module, or Offshore Weather Forecast module using Artificial Intelligence and Hybrid Data The forecast system can provide inference about the main weather factors, including: wind speed and direction, air temperature, solar radiation, atmospheric pressure, relative humidity, and more. In an example the weather forecasts typically span over a period, for example, Jun. 12, 2024 hours to 7 days. The system can be applied across variety of industries, where the business processes are in any way dependent on short term weather forecasting.

In an embodiment, the system can remove much of the initialization error for weather forecasts by initializing on a variety of structured (numerical) and unstructured (satellite images, videos, radars, sounds, text, etc.) measurements and utilizing machine learning techniques to project forward weather characteristics. It is unique in its ability to quickly retrain to different objective functions given a variety of structured and unstructured inputs.

Although they command the headlines, weather's subtler effects are felt in numerous other ways. For example, the solar energy market has grown at a 58% CAGR since 2010, while the installed wind energy generation capacity has doubled four times since 2000. While hurricanes and tornadoes steal the headlines, solar energy and wind energy markets have quietly grown to be worth $100 billion, each.

Conventional weather forecasting systems are ill-equipped for the world's renewable future. The best available computer models are rules-based dynamical models and are built to forecast temperatures, a feature they perform quite well. However, the same models, and the forecasters who rely on them, do a poor job of forecasting wind speed or solar intensity—the key drivers of wind and solar generation (respectively). In addition, the weather community's accuracy in hurricane forecasting is woeful; despite the loss of life and costly property damage, few models significantly outperform straight-line interpolation.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system for forecasting a weather indicator, the system comprising:
   at least one server implementing a weather forecast engine and in communication with a network, the server configured to access historical and current satellite imagery, published weather predictions, and local measured data via the network, the local measured data including at least one measure of irradiance;
   wherein the weather forecast engine is configured to:
      determine at least one factor from the satellite imagery;
      train regional modules using the historical satellite imagery, published weather predictions, determined factors, local measured data, and irradiance measure; and
      apply the current satellite imagery, published weather predictions, determined factors, local measured data, and irradiance measure to the trained regional modules to obtain regional forecasts for the weather indicator.

2. The system of claim 1, wherein each of the regional modules comprises one or more of regression models, Markov chains, time series models, state space models, Bayesian models, boosted decision trees, neural networks, convolutional neural networks, and recurrent neural networks.

3. The system of claim 2, wherein each of the regional modules comprises one or more long short-term memory networks.

4. The system of claim 1, wherein the factor determined from the satellite imagery relates to the percentage of cloud cover.

5. The system of claim 1, wherein at least a part of the satellite imagery comprises an overlay, and the factor determined from the satellite imagery is derived from the overlay.

6. The system of claim 1, wherein the forecast weather indicator is wind speed.

7. The system of claim 1, wherein the forecast weather indicator is wind direction.

8. The system of claim 1, wherein the forecast weather indicator is solar irradiance.

9. The system of claim 1, wherein the forecast weather indicator is cloud cover percentage.

10. A method for forecasting a weather indicator with a weather forecast engine implemented by one or more processors, the method comprising:
   receiving historical and current satellite imagery, published weather predictions, and local measured data, the local measured data including at least one measure of irradiance;
   determining, with the weather forecast engine, at least one factor based on the satellite imagery;
   training, by the weather forecast engine, regional modules using the historical satellite imagery, published weather predictions, determined factors, local measured data, and irradiance measure; and
   applying, using the weather forecast engine, the current satellite imagery, published weather predictions, determined factors, local measured data, and irradiance measure to the trained regional modules to obtain regional forecasts for the weather indicator.

11. The method of claim 10, wherein each of the regional modules comprises one or more of regression models, Markov chains, time series models, state space models, Bayesian models, boosted decision trees, neural networks, convolutional neural networks, and recurrent neural networks.

12. The method of claim 11, wherein each of the regional modules comprises one or more long short-term memory networks.

13. The method of claim 10, wherein the factor determined from the satellite imagery relates to the percentage of cloud cover.

14. The method of claim 10, wherein at least a part of the satellite imagery comprises an overlay, and the factor determined from the satellite imagery is derived from the overlay.

15. The method of claim 10, wherein the forecast weather indicator is wind speed.

16. The method of claim 10, wherein the forecast weather indicator is wind direction.

17. The method of claim 10, wherein the forecast weather indicator is solar irradiance.

18. The method of claim 10, wherein the forecast weather indicator is cloud cover percentage.

19. The method of claim 10, wherein the forecast weather indicator relates to the prediction of a weather-related natural disaster.

* * * * *